(12) United States Patent
Kono et al.

(10) Patent No.: US 10,119,485 B2
(45) Date of Patent: Nov. 6, 2018

(54) VEHICLE CONTROL DEVICE

(71) Applicant: Mazda Motor Corporation, Aki-gun, Hiroshima (JP)

(72) Inventors: Kanta Kono, Hiroshima (JP); Atsushi Yamasaki, Hiroshima (JP); Kyohei Ike, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/699,407

(22) Filed: Sep. 8, 2017

(65) Prior Publication Data
US 2018/0073454 A1 Mar. 15, 2018

(30) Foreign Application Priority Data

Sep. 9, 2016 (JP) ................................ 2016-176258

(51) Int. Cl.
*F02D 41/02* (2006.01)
*F02D 11/10* (2006.01)
(Continued)

(52) U.S. Cl.
CPC ........ *F02D 41/0225* (2013.01); *F02D 11/105* (2013.01); *F02D 11/106* (2013.01); *F02D 41/0002* (2013.01); *F02D 41/10* (2013.01); *F16H 63/50* (2013.01); *F02D 2041/1416* (2013.01); *F02D 2041/1422* (2013.01);
(Continued)

(58) Field of Classification Search
CPC .... F02D 41/02; F02D 41/0225; F02D 11/105; F02D 11/106; F02D 41/0002; F02D 41/10; F02D 2041/1416; F02D 2041/1422; F02D 2200/1004; F02D 2250/18; F02D 2250/28; F16H 63/50
See application file for complete search history.

(56) References Cited

U.S. PATENT DOCUMENTS 5,580,330 A * 12/1996 Minowa ................ B60W 10/06
477/110
6,434,472 B1 * 8/2002 Minowa ............. B60K 31/0008
477/115
(Continued)

FOREIGN PATENT DOCUMENTS

JP 3750626 B2 3/2006
JP 5920147 B2 5/2016

*Primary Examiner* — Hieu T Vo
(74) *Attorney, Agent, or Firm* — Alleman Hall Creasman & Tuttle LLP

(57) ABSTRACT

A control device of a vehicle is provided. The vehicle includes a drive source, wheels, a driving force transmission shaft provided in a driving force transmission path extending from the drive source to the wheels, and an accelerator position sensor for detecting a depression amount of an accelerator pedal. The control device estimates or detects a torsion angle of a drive source side end portion of the shaft with respect to a wheel side end portion, an instruction to the drive source to generate a first torque corresponding to the depression amount of the pedal when the depression is determined to have started, and instructs the drive source to generate a second torque when a change rate of the torsion angle is determined to have inverted from a positive rate to a negative rate for the first time after the depression is determined to have started.

20 Claims, 8 Drawing Sheets

(51) Int. Cl.
*F16H 63/50* (2006.01)
*F02D 41/10* (2006.01)
*F02D 41/00* (2006.01)
*F02D 41/14* (2006.01)

(52) U.S. Cl.
CPC .. *F02D 2200/1004* (2013.01); *F02D 2250/18* (2013.01); *F02D 2250/28* (2013.01)

(56) References Cited

U.S. PATENT DOCUMENTS 9,284,902 B2 * 3/2016 Keller ................. F02D 41/0215
9,580,068 B2 * 2/2017 Mohri ................... B60L 11/005

* cited by examiner

VEHICLE CONTROL DEVICE

BACKGROUND

The present disclosure relates to a vehicle control device, and particularly to an art for vibration damping control during vehicle acceleration.

Conventionally, it is known that vibration occurs in vehicles due to torsion in a driving force transmission shaft provided between a drive source (such as an engine) and vehicle wheels. In order to reduce such vibration, various research and development has been conducted.

For example, JP3750626B discloses an art for estimating, by using an observer (state estimator), a torsion angle of a torsional damper that is provided between an engine and a motor of a hybrid electric vehicle, and correcting a crank angle of the engine based on the estimated torsion angle. Thus, torsional vibration of a driving force transmission shaft is reduced.

Further, JP5920147B discloses an art for reducing vehicle vibration caused by torsion in a driving force transmission shaft during a gear shift, i.e., when a gear reduction ratio of a transmission is changed. For example, rotational speeds of a drive shaft at an engine side and a vehicle wheel side are estimated by using an observer model, a difference between the estimated speeds is calculated, and a feedback control is executed by using a torque correction amount based on the calculated speed difference. Thus, the vehicle vibration caused by torsion in the driving force transmission shaft during the gear shift is reduced.

With the conventional arts, a satisfactory acceleration sensation, when a vehicle driver depresses an accelerator pedal for acceleration, cannot be provided to the driver while reducing undesired vehicle vibration caused by the torsion in the driving force transmission shaft.

Particularly in cases where the arts described in JP3750626B and JP5920147B are adopted, an engine torque is corrected to reduce the vehicle vibration even during acceleration. For this reason, it is difficult to provide a satisfactory response to the driver's acceleration request during the vehicle acceleration.

SUMMARY

The present disclosure is made in view of solving the issues as described above, and aims to provide a vehicle control device that reduces vehicle vibration caused by torsion in a driving force transmission shaft even during acceleration and provides a satisfactory response to a driver's acceleration request.

A vehicle control device according to one aspect of the present disclosure controls a vehicle with the following configuration.

The vehicle includes a drive source for generating torque as a driving force, wheels, a driving force transmission shaft provided in a driving force transmission path extending from the drive source to the wheels, and an accelerator position sensor for detecting a depression amount of an accelerator pedal.

The vehicle control device performs (i) one of estimation and detection of a torsion angle of a first end portion of the driving force transmission shaft at a drive source side with respect to a second end portion at a wheel side, (ii) an instruction to the drive source to generate a first torque corresponding to the depression amount of the accelerator pedal when the depression of the accelerator pedal is determined to have started based on a detection result of the accelerator position sensor, and (iii) an instruction to the drive source to generate a second torque when a change rate of the torsion angle is determined to have inverted from a positive rate to a negative rate for the first time after the depression of the accelerator pedal is determined to have started, the change rate of the torsion angle determined based on the acquisition result of the torsion angle, the second torque being lower than the first torque.

The vehicle control device with the above configuration controls the drive source to generate the second torque which is lower than the first torque when the change rate of the torsion angle of the driving force transmission shaft is determined to have inverted from a positive rate to a negative rate for the first time after the depression of the accelerator pedal is determined to have started. In other words, with this configuration, after the depression of the accelerator pedal has started, until the change rate of the torsion angle is inverted from a positive rate to a negative rate, the drive source is controlled to generate the first torque corresponding to the depression amount of the accelerator pedal.

Therefore, at least after the depression of the accelerator pedal is started, until the change rate of the torsion angle of the driving force transmission shaft is inverted from a positive rate to a negative rate, the vehicle control device with this configuration instructs the drive source to output the first torque corresponding to the depression amount of the accelerator pedal. Therefore, a satisfactory response to a driver's acceleration request is provided.

Note that "corresponding to" in the above description indicates a situation where the depression amount of the accelerator pedal is directly reflected without any torque correction, or a situation where, even if a torque correction is performed, a correction amount is as extremely small such that the driver can barely notice the correction.

Further, with this configuration, after the change rate of the torsion angle of the driving force transmission shaft is determined to have inverted from a positive rate to a negative rate for the first time, the drive source is controlled to generate the second torque which is relatively lower than the first torque. Therefore, vibration of the vehicle caused by the torsion of the driving force transmission shaft is effectively reduced. That is, the present inventors, etc. found that the phenomenon in which the change rate of the torsion angle of the driving force transmission shaft is inverted from a positive rate to a negative rate or vice versa greatly influences the vibration of the vehicle. Therefore, with this configuration, after determining the first time that the change rate of the torsion angle of the driving force transmission shaft is inverted from a positive rate to a negative rate, the vibration of the vehicle during acceleration is effectively reduced by controlling the drive source to generate the second torque which is relatively lower than the first torque.

In this manner, also during the acceleration, the vehicle control device with this configuration reduces the vibration of the vehicle caused by the torsion of the driving force transmission shaft, and provides the satisfactory response to the driver's acceleration request.

The second torque may be set based on at least one of a change amount and the change rate of the torsion angle from a first time point when the depression of the accelerator pedal is determined to have started until a second time point when the change rate of the torsion angle is determined to have inverted from a positive rate to a negative rate for the first time.

Since the second torque is set based on at least one of the change amount and the change rate of the torsion angle until the second time point, the vehicle control device with the above configuration effectively reduces the vibration of the vehicle. This configuration is based on the knowledge, found by the present inventors, etc., that the change amount and the change rate of the torsion angle until the second time point where the change rate of the torsion angle is inverted greatly influences the vibration of the vehicle during the acceleration.

The drive source may be instructed to generate the second torque for a given period of time from the second time point.

The inversions from "positive" to "negative" and from "negative" to "positive" of the change rate in the torsion angle of the driving force transmission shaft respectively occur a plurality of times from the second time point. Here, with this configuration, by controlling the drive source to generate the second torque for the given period of time, the vibration of the vehicle during the acceleration is effectively reduced.

The vehicle may also include a transmission provided in the driving force transmission path. The given time period may be set according to a gear ratio of the transmission.

With this configuration, considering that the gear ratio of the transmission influences the number of times of inversions in torsion of the driving force transmission shaft, the given time period is set according to the gear ratio of the transmission. As a result, the vibration of the vehicle during the acceleration is effectively reduced at any gear ratio.

After the given time period, the drive source may be instructed to generate a third torque that is lower than the first torque and higher than the second torque.

With this configuration, after the vibration of the vehicle is reduced by converging the inversions in the change rate of the torsion angle of the driving force transmission shaft during the given time period, the drive source is controlled to generate the third torque. By shifting the control of the drive source to the control to the third torque without executing the control to an excessively low torque (second torque), the vehicle travels under an optimal condition, resulting in obtaining an advantage in terms of reducing energy consumption and environmental load.

The drive source may be instructed to generate the second torque from the second time point until the change rate of the torsion angle is determined to have inverted from a positive rate to a negative rate a given number of times.

With this configuration, when the inversion of the torsion of the driving force transmission shaft is performed the given number of times, the drive source is controlled to generate the third torque which is higher than the second torque. Also by this, the suitable response to the driver's request is provided while reducing the vibration of the vehicle during the acceleration.

After the change rate of the torsion angle is determined to have inverted from a positive rate to a negative rate the given number of times, the drive source may be instructed to generate a third torque that is lower than the first torque and higher than the second torque.

Also with this configuration, by shifting the control of the drive source to the control of the third torque without executing the control to an excessively low torque (second torque), the response to the request according to the driver's operation is provided.

The drive source may be an internal combustion engine. The vehicle may also include a throttle valve, a variable valve mechanism, an ignition plug, and a fuel injector that are attached to the drive source. The drive source may generate the first torque and the second torque by controlling at least one of the throttle valve, the variable valve mechanism, the ignition plug, and the fuel injector.

With this configuration, a specific control mode of a case where the internal combustion engine, such as a gasoline engine, is adopted as the drive source is defined. That is, with this configuration, the control of the drive source (internal combustion engine) to the first torque and the second torque is executed by controlling at least one of the throttle valve, the variable valve mechanism, the ignition plug, and the fuel injector.

The torsion angle of the driving force transmission shaft may be estimated by using an observer model describing behavior of a control target model that is a model of a driving force transmission system of the vehicle including the driving force transmission shaft.

With this configuration, since the torsion angle of the driving force transmission shaft is estimated by using the observer model, even in a case where the torsion angle of the driving force transmission shaft changes from moment to moment during the acceleration, the torsion angle of the driving force transmission shaft is estimated with high accuracy. Thus, the inversion of the torsion of the driving force transmission shaft is reliably converged and the vibration of the vehicle is reliably reduced.

A torque correction amount that is a correction amount of the first torque according to the depression amount of the accelerator pedal may be calculated based on the estimated torsion angle of the driving force transmission shaft. The second torque may be a value obtained by correcting the first torque according to the torque correction amount.

With this configuration, since the second torque is set by using the correction amount as described above, a highly accurate vibration damping control is executed.

The torque correction amount may be set to gradually decrease according to a given cycle regarding the torsion angle of the driving force transmission shaft. By this, the torsion vibration of the driving force transmission shaft is effectively reduced.

A feedback control may be executed to control the torque.

With this configuration, since the drive source is controlled by the feedback control, the highly accurate vibration damping control is executed according to the situation changing from moment to moment.

A vehicle control device according to another aspect of the present disclosure controls a vehicle with the following configuration.

The vehicle includes a drive source for generating torque as a driving force, wheels, a driving force transmission shaft provided in a driving force transmission path extending from the drive source to the wheels, and an acceleration request accepting member for accepting an acceleration request having an acceleration request amount from a driver of the vehicle.

Note that for the "acceleration request accepting member" in the above description, a member with which the driver manually requests acceleration (e.g., a set vehicle speed change button of a cruise control) and a member with which the driver requests acceleration through his/her foot control (e.g., an accelerator pedal) are applicable.

The vehicle control device performs (i) one of estimation and detection of a torsion angle of a first portion of the driving force transmission shaft at a drive source side with respect to a second end portion at a wheel side, (ii) an instruction to the drive source to generate a first torque corresponding to the acceleration request amount when the acceleration request accepting member accepts the acceleration request to the vehicle, and (iii) an instruction to the drive source to generate a second torque when a change rate of the torsion angle is determined to have inverted from a positive rate to a negative rate for the first time after the acceleration request is accepted, the change rate of the torsion angle determined based on the acquisition result of the torsion angle, the second torque being lower than the first torque.

The vehicle control device with the above configuration controls the drive source to generate the second torque which is lower than the first torque when the change rate of the torsion angle of the driving force transmission shaft is determined to have inverted from a positive rate to a negative rate for the first time after the acceleration request by the driver to the vehicle is determined to have accepted. In other words, with this configuration, after the driver started the operation on the acceleration request accepting member, until the torsion angle is inverted from a positive rate to a negative rate, the drive source is controlled to generate the first torque corresponding to the detected acceleration request amount.

Therefore, at least after the driver started the operation on the acceleration request accepting member, until the torsion angle of the driving force transmission shaft is inverted from a positive rate to a negative rate, the vehicle control device with this configuration instructs the drive source to output the first torque corresponding to the detected acceleration request amount. Therefore, a satisfactory response to a driver's acceleration request is provided.

Note that similar to the above aspect, "corresponding to" in the above (ii) indicates a situation where the acceleration request amount from the driver is directly reflected without any torque correction, or a situation where, even if a torque correction is performed, a correction amount is extremely small such that the driver can barely notice the correction.

Further, with this configuration, after determining the first time that the change rate of the torsion angle of the driving force transmission shaft is inverted from a positive rate to a negative rate, the drive source is controlled to generate the second torque which is relatively lower than the first torque. Thus, the vibration of the vehicle caused by the torsion of the driving force transmission shaft is effectively reduced.

In this manner, also during the acceleration, the vehicle control device of this aspect reduces the vibration of the vehicle caused by the torsion of the driving force transmission shaft, and provides the satisfactory response to the driver's acceleration request.

DETAILED DESCRIPTION OF EMBODIMENTS

Hereinafter, some embodiments of the present disclosure are described with reference to the accompanying drawings. Note that the following embodiments are some modes of the present disclosure, and the present disclosure is not intended to be limited in any way except for its essential configuration.

First Embodiment

1. Configuration of Vehicle 1

Figure 1:
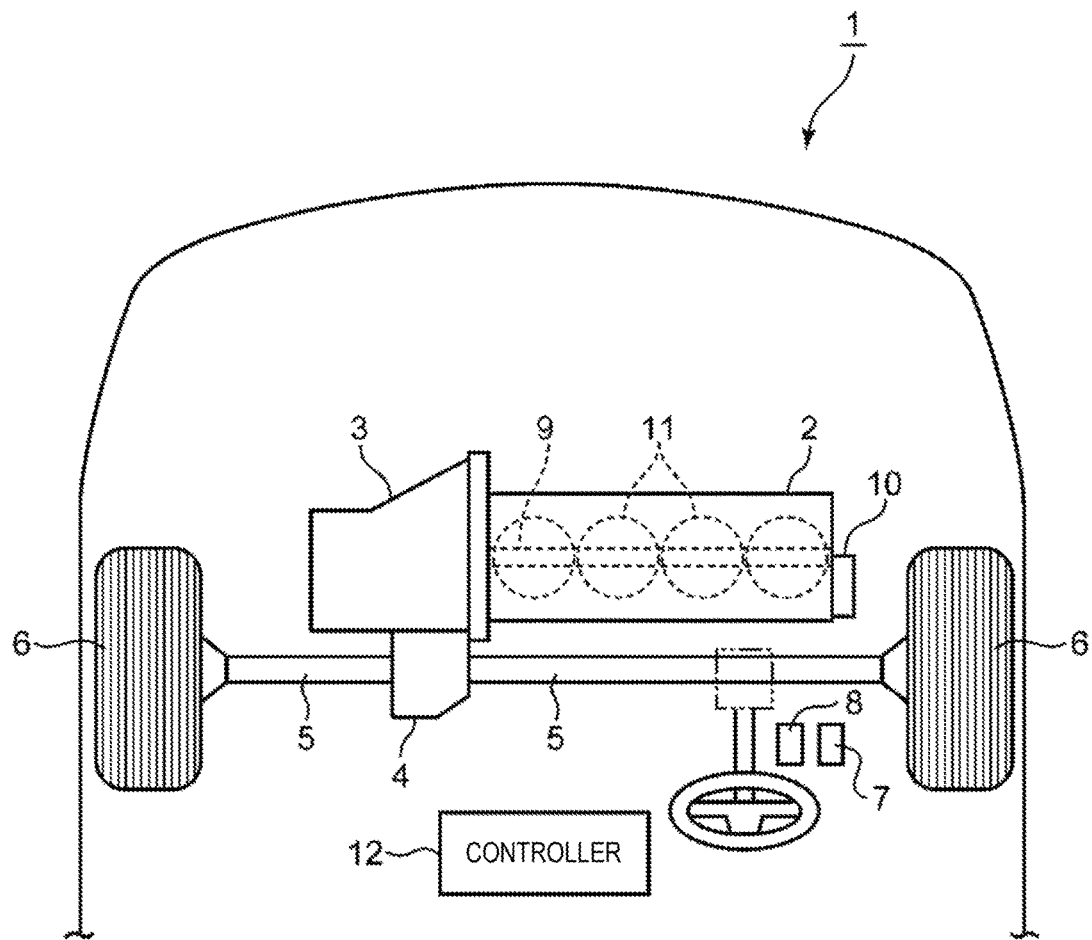
FIG. 1 is a schematic diagram illustrating a partial configuration of a vehicle according to a first embodiment of the present disclosure.
Figure 2:
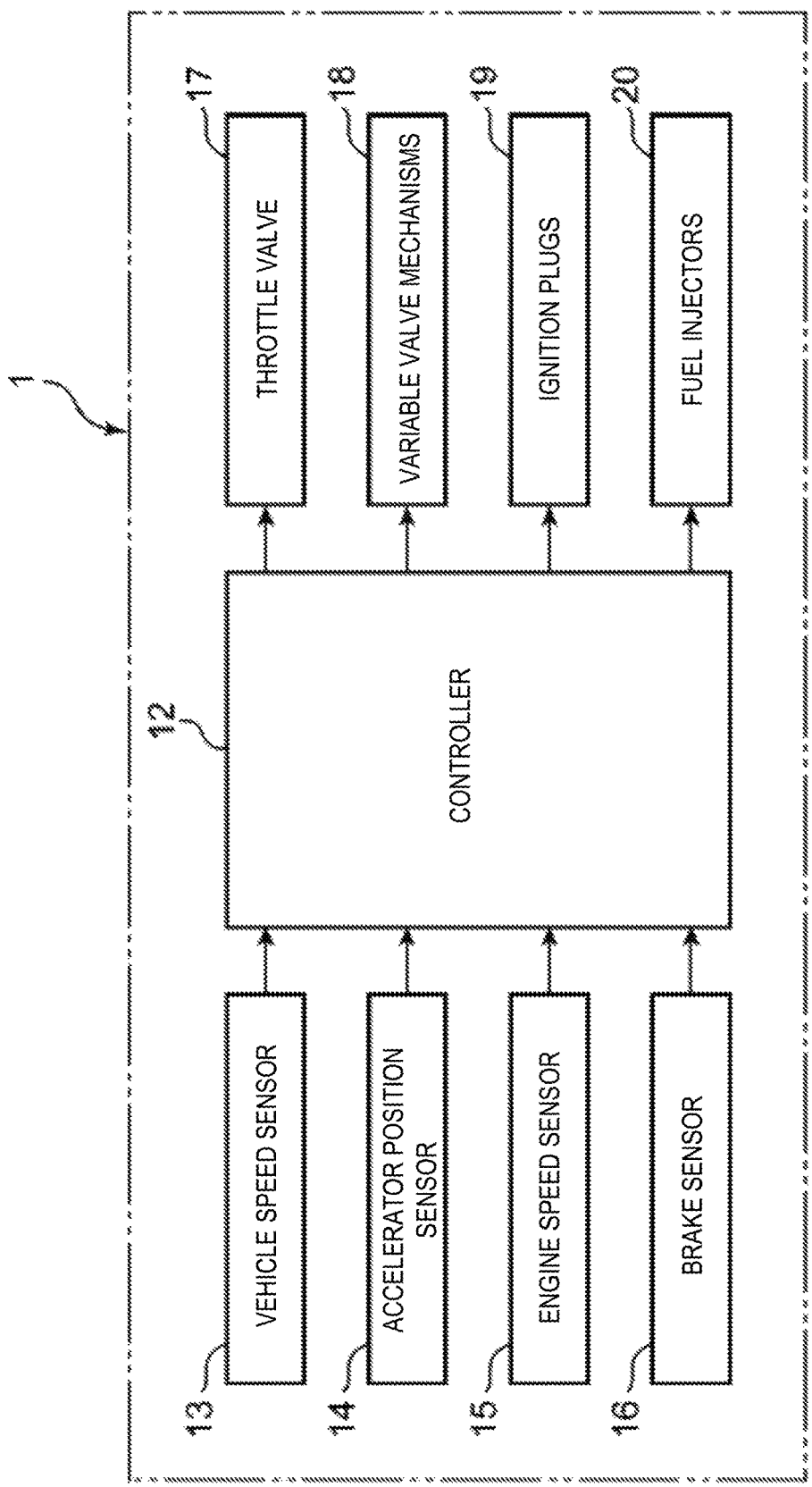
FIG. 2 is a schematic block diagram illustrating a configuration related to a control system of the vehicle.

A configuration of a vehicle 1 of this embodiment is described with reference to FIGS. 1 and 2. FIG. 1 is a schematic diagram illustrating a partial configuration of the vehicle 1. FIG. 2 is a schematic block diagram illustrating a configuration related to a control system of the vehicle 1.

As illustrated in FIG. 1, the vehicle 1 includes an engine 2, a transmission 3, a differential gear 4, a pair of drive shafts 5, a pair of vehicle wheels 6, and a controller 12.

The engine 2 is provided as a drive source of the vehicle 1 and is an internal combustion engine that obtains a driving force by combusting fuel inside. Although the type of the engine 2 is not particularly limited, as one example, a four-cycle multi-cylinder gasoline engine is adopted. Although not illustrated in detail, the engine 2 of this embodiment includes a plurality of cylinders 11 where pistons are reciprocatably accommodated, and a crankshaft 9 that is an output shaft.

As illustrated in FIG. 2, a throttle valve 17, variable valve mechanisms 18, ignition plugs 19, and fuel injectors 20 are attached to the engine 2. The throttle valve 17 is provided in an intake passage for adjusting an amount of air supplied to the cylinders 11 of the engine 2. Each ignition plug 19 ignites, by a spark, a mixture gas containing air and fuel which is injected from the fuel injector 20.

As illustrated in FIG. 1, an alternator 10 for generating power by acquiring the driving force from the crankshaft 9 is attached to the engine 2. The power generated by the alternator 10 is charged in an electrical storage device, such as a battery (not illustrated). The power of the electric storage device is used for operating various electrical components provided in the vehicle.

The transmission 3 is a continuously variable transmission or an automatic transmission with a planetary gear, which transmits the rotation of the crankshaft 9 of the engine 2 to the drive shaft 5 while decelerating it. The vehicle 1 of this embodiment is a so-called front-engine, front-wheel-drive (FF) vehicle, and the transmission 3 is integrated with a differential gear 4 as a differential device.

The controller 12 is a PCM (Powertrain Control Module) and controls the throttle valve 17, the variable valve mechanisms 18, the ignition plugs 19, and the fuel injectors 20 which are connected to the engine 2 according to a traveling state of the vehicle 1, etc.

As illustrated in FIG. 2, various information is sequentially inputted to the controller 12 from a plurality of sensors provided in the vehicle 1. For example, the vehicle 1 is provided with a vehicle speed sensor 13, an accelerator position sensor 14, an engine speed sensor 15, and a brake sensor 16. The sensors 13 to 16 sequentially input detected information to the controller 12.

The vehicle speed sensor 13 detects a speed of the vehicle 1. The accelerator position sensor 14 detects a depression amount of an accelerator pedal 7 (see FIG. 1) by a vehicle driver (accelerator opening). The engine speed sensor 15 detects the rotational speed of the crankshaft 9 of the engine 2. The brake sensor 16 detects pressure of brake fluid (brake pressure) when the driver depresses a brake pedal 8 illustrated in FIG. 1.

The detected information from these sensors 13 to 16 are sequentially inputted to the controller 12 while the vehicle 1 is driven.

The controller 12 performs various calculations based on the inputted information from the sensors 13 to 16 and sequentially determines torque to be generated in the engine 2 according to the situation. Further, the controller 12 determines an optimal condition for generating the determined torque, and outputs corresponding control signals to the throttle valve 17, the variable valve mechanisms 18, the ignition plugs 19, and the fuel injectors 20.

2. Torque Control of Engine 2 by Controller 12

The torque control of the engine 2 by the controller 12 is described with reference to FIG. 3 which is a schematic functional block diagram illustrating functional parts of the controller 12 related to the torque control of the engine 2.

Figure 3:
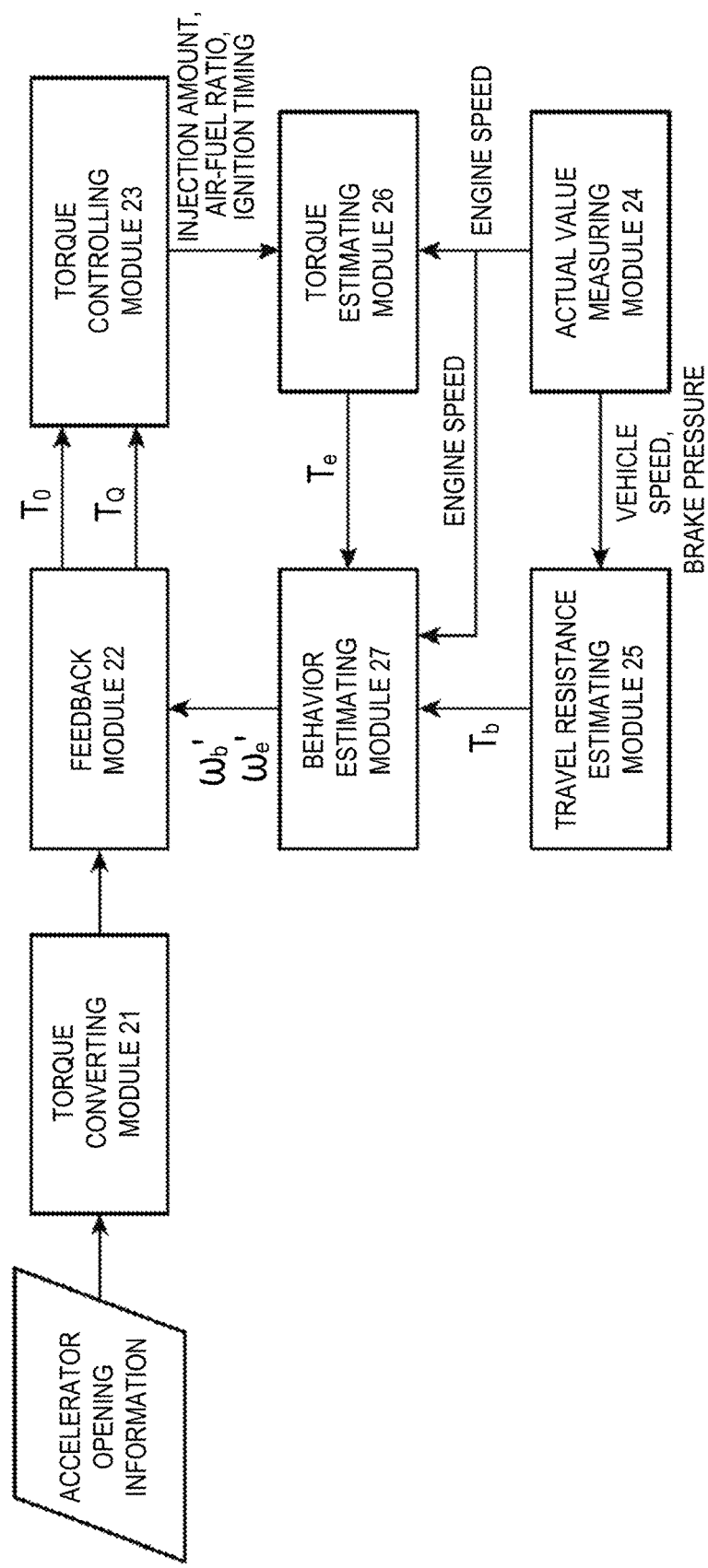
FIG. 3 is a schematic functional block diagram illustrating functional parts of a controller related to a torque control of an engine.

As illustrated in FIG. 3, the controller 12 includes a torque converting module 21, a feedback module 22, a torque controlling module 23, an actual value measuring module 24, a travel resistance estimating module 25, a torque estimating module 26, and a behavior estimating module 27. These modules are software stored in memory and executed by a processor of the controller 12 to achieve their respective functions.

The torque converting module 21 is a functional part which calculates a requested torque $T_0$ of the engine 2 based on the accelerator opening information inputted from the accelerator position sensor 14. Here, the requested torque $T_0$ calculated by the torque converting module 21 is a value obtained under the assumption that each drive shaft 5 is a rigid body so that torsion of the drive shaft 5 is not taken into consideration. Therefore, the requested torque $T_0$ calculated by the torque converting module 21 is simply set to be proportional to the accelerator opening. That is, the torque converting module 21 sets a higher requested torque $T_0$ as the accelerator opening increases.

The torque controlling module 23 calculates an intake air amount, a fuel injection amount, and an ignition timing of the engine 2 required for generating the requested torque $T_0$ set by the torque converting module 21. As target control values for achieving the intake air amount, the fuel injection amount, and the ignition timing described above, the torque controlling module 23 further sets a target opening of the throttle valve 17, a target opening period of the fuel injector 20, a target charging timing of the ignition plug 19, etc.

The actual value measuring module 24 sequentially acquires measurement values of the engine speed, the vehicle speed, the brake pressure, etc. based on the inputted signals from the vehicle speed sensor 13, the engine speed sensor 15, and the brake sensor 16.

Based on the vehicle speed and the brake pressure inputted from the actual value measuring module 24, the travel resistance estimating module 25 calculates a travel resistance $T_b$ estimated to be added to the vehicle 1 (travel resistance estimation value). For example, a given calculation formula using the vehicle speed and the brake pressure as variables is used to calculate the travel resistance estimation value $T_b$, and as the vehicle speed and the brake pressure increase, the travel resistance estimation value $T_b$ is calculated to be higher.

Based on the target control values of the throttle valve 17, the fuel injector 20 and the ignition plug 19 set by the torque controlling module 23, and the engine speed acquired by the actual value measuring module 24, the torque estimating module 26 calculates a torque $T_e$ estimated to be actually generated by the engine 2 (engine torque estimation value).

For example, torque characteristic data of the engine 2 stored in advance in the memory is used to calculate the engine torque estimation value $T_e$. That is, the controller 12 is provided with the torque characteristic data based on an actual value of the torque when the engine 2 is operated under various conditions, in other words, data experimentally specifying a change in the torque generated by the engine 2 (engine torque) depending on various parameters, such as the fuel injection amount, the air-fuel ratio, the ignition timing, the engine speed, etc. Further, the engine torque estimation value $T_e$ corresponding to the engine speed and the target control values of the throttle valve 17, the fuel injector 20, and the ignition plug 19, are set based on the torque characteristic data.

The behavior estimating module 27 estimates various state quantities of the vehicle 1 based on the engine speed acquired by the actual value measuring module 24, the engine torque estimation value $T_e$ set by the torque estimating module 26, and the travel resistance estimation value $T_b$ of the vehicle 1 estimated by the travel resistance estimating module 25.

For example, the behavior estimating module 27 estimates the various state quantities related to the torsion of the drive shaft 5, etc., by using the equation described later (observer equation (2)) based on the known values, such as the engine speed (more precisely, the value converted into the rotation of the drive shaft 5), the engine torque estimation value $T_e$, and the travel resistance estimation value $T_b$.

By estimating the state quantities with the observer equation (observer model) using the known values as described above, unlike the case where the state quantities are directly measured using sensors, etc., accurate state quantities are obtained without easily being influenced by noise, etc.

The state quantities estimated by the behavior estimating module 27 include the rotational speed of the drive shaft 5 on the engine 2 side and the rotational speed of the drive shaft 5 on the wheel 6 side. Here, "the rotational speed of the drive shaft 5 on the engine 2 side" is the rotational speed $\omega_e$ of each drive shaft 5 at a first end portion closer to the engine 2 (and the transmission 3) in the control object model illustrated in FIG. 4 (described later), and "the rotational speed of the drive shaft 5 on the wheel 6 side" is the rotational speed cob of each drive shaft 5 at a second end portion closer to the wheel 6. In the following description, the estimation values of these two rotational speeds $\omega_e$ and $\omega_b$ according to the observer equation are expressed as the engine-side estimation speed $\omega_e'$ of the drive shaft 5 and the wheel-side estimation speed $\omega_b'$ of the drive shaft 5, respectively.

The feedback module 22 sets a torque correction amount $T_Q$ for converging torsional vibration of the drive shaft 5 based on a difference between the engine-side estimation speed $\omega_e'$ and the wheel-side estimation speed $\omega_b'$ of the drive shaft 5 which are estimated by the behavior estimating module 27.

That is, since the two estimation speeds $\omega_e'$ and $\omega_b'$ being different form each other means that the torsion amount of the drive shafts 5 is changing, the feedback module 22 calculates a required amount of correction for avoiding such a change in the torsion amount of the drive shaft 5, and sets the calculated value as the torque correction amount $T_Q$.

For example, when the engine-side estimation speed $\omega_e'$ of the drive shaft 5 is higher than the wheel-side estimation speed $\omega_b'$ of the drive shaft 5, the engine-side estimation speed $\omega_e'$ is required to be reduced so as to avoid the change in the torsion amount of the drive shaft 5. Therefore, in this case, the engine torque is corrected to be reduced (the torque correction amount $T_Q$ becomes a "negative" value).

On the other hand, when the engine-side estimation speed $\omega_e'$ of the drive shaft 5 is lower than the wheel-side estimation speed $\omega_b'$ of the drive shaft 5, the engine-side estimation speed $\omega_e'$ is required to be increased so as to avoid the change in the torsion amount of the drive shaft 5. Therefore, in this case, the engine torque is corrected to be increased (the torque correction amount $T_Q$ becomes a "positive" value).

The torque correction amount $T_Q$ set by the feedback module 22 is outputted to the torque controlling module 23.

The torque controlling module 23 sets a corrected target torque $T_{fb}$, which is a value obtained by adding the torque correction amount $T_Q$ inputted from the feedback module 22 to the above-described requested torque $T_0$. Further, in order to generate the set corrected target torque $T_{fb}$, the torque controlling module 23 resets the target values of the intake air amount, the fuel injection amount, and the ignition timing, and based on these values, the torque controlling module 23 controls the throttle valve 17, the fuel injector 20, and the ignition plug 19.

Here, although various methods may be considered for correcting the engine torque by the torque correction amount $T_Q$, in this embodiment, the torque is adjusted as follows.

First, when the torque correction amount $T_Q$ is "negative" and the engine torque reduction is required, the ignition timing (the timing of ignition within the cylinder 11 by the ignition plug 19) is retarded, in other words, the ignition timing is retarded from the original timing (a timing determined according to the situation so that optimal combustion is performed). Thus, the timing of combustion of the mixture gas within the cylinder 11 is retarded so that the engine torque reduces.

Next, when the torque correction amount $T_Q$ is "positive" and the engine torque increase is required, the power generation amount of the alternator 10 which generates power by acquiring the driving force from the engine 2 is reduced. Thus, the resistance force applied to the engine 2 from the alternator 10 is reduced. As a result, substantially the same effect as when the engine torque is increased is obtained.

As described above, in this embodiment, the controller 12 executes the torque control by the feedback control.

3. Method of Estimating State Quantities

Figure 4:
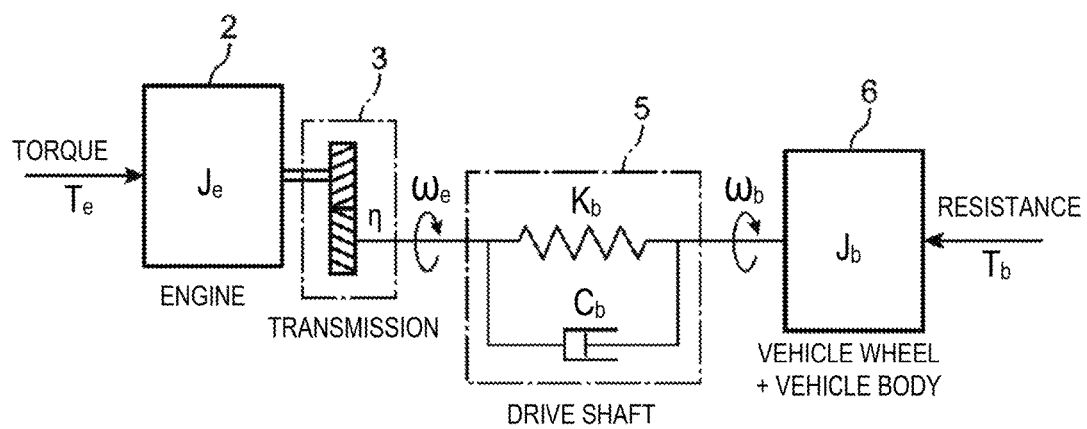
FIG. 4 is a schematic diagram illustrating one model of a driving force transmission system of the vehicle.

Next, with reference to FIG. 4, the method of estimating the various state quantities by the behavior estimating module 27 is described using specific calculation formulas. FIG. 4 is a schematic diagram illustrating one model of a driving force transmission system of the vehicle 1 which transmits the output torque of the engine 2 to the wheels.

As illustrated in FIG. 4, the driving force transmission system of the vehicle 1 according to this embodiment includes the transmission 3 and the drive shafts 5 provided between the engine 2 and the wheels 6.

The transmission 3 decelerates the rotation of the crankshaft 9 (see FIG. 1) of the engine 2.

The drive shafts 5 connect the output shaft of the transmission 3 with the wheels 6. Note that each drive shaft 5 has an element as a spring which torsionally deforms in proportion to the torque and an element as a damper which generates a resistance force proportional to the speed of the torsional deformation. Therefore, FIG. 4 illustrates the drive shafts 5 as a combination of the spring and the damper.

A state equation of the vehicle 1 which is derived from the control target model illustrated in FIG. 4 is expressed by the following equation (1).

$$\dot{\chi} = A\chi + B_e T_e + B_0 T_b \quad (1)$$

$$\text{wherein, } \chi = \begin{bmatrix} \omega_e \\ \omega_b \\ \theta \end{bmatrix} \quad \dot{\chi} = \frac{d\chi}{dt} \text{ (``t'' is time)}$$

$$A = \begin{bmatrix} -\dfrac{C_b}{\eta^2 J_e} & \dfrac{C_b}{\eta^2 J_e} & -\dfrac{K_b}{\eta^2 J_e} \\ \dfrac{C_b}{J_b} & \dfrac{C_b}{J_b} & \dfrac{K_b}{J_b} \\ 1 & -1 & 0 \end{bmatrix} \quad B_e = \begin{bmatrix} \dfrac{1}{\eta J_e} \\ 0 \\ 0 \end{bmatrix} \quad B_0 = \begin{bmatrix} 0 \\ -\dfrac{1}{J_b} \\ 0 \end{bmatrix}$$

The definition of the respective values in the above state equation (1) are as shown in the following Table 1.

TABLE 1

| | | |
|---|---|---|
| $\chi$ | $\omega_e$ | Rotational speed of drive shaft on engine side [rad/s] |
| | $\omega_b$ | Rotational speed of drive shaft on wheel side [rad/s] |
| | $\theta$ | Torsion amount of drive shaft [rad] |
| | $T_e$ | Engine torque [N · m] |
| | $T_b$ | Travel resistance [N · m] |
| | $J_e$ | Inertia of engine + transmission [kg · m$^2$] |
| | $J_b$ | Inertia of vehicle wheel + vehicle body [kg · m$^2$] |
| | $K_b$ | Stiffness of drive shaft (spring constant) [kg · m$^2$/s$^2$] |
| | $C_b$ | Damping efficient of drive shaft [kg · m$^2$/s] |
| | $\eta$ | Reduction gear ratio of transmission |

The following observer equation (2) may also be derived by modifying the above state equation (1) so as to estimate the various state quantities, including a travel resistance error.

$$\dot{\chi}_{ext} = A_{ext}\chi_{ext} + B_{ext1}T_e + B_{ext2}T_b - K(C_{ext}\chi_{ext} - \omega_e) \quad (2)$$

$$\text{wherein, } \chi_{ext} = \begin{bmatrix} \omega_e' \\ \omega_b' \\ \theta' \\ T_{err}' \end{bmatrix} \quad \dot{\chi}_{ext} = \frac{d\chi_{ext}}{dt} \text{ (``t'' is time)}$$

$$A_{ext} = \begin{bmatrix} A & B_0 \\ O & 0 \end{bmatrix} = \begin{bmatrix} -\dfrac{C_b}{\eta^2 J_e} & \dfrac{C_b}{\eta^2 J_e} & -\dfrac{K_b}{\eta^2 J_e} & 0 \\ \dfrac{C_b}{J_b} & \dfrac{C_b}{J_b} & \dfrac{K_b}{J_b} & -\dfrac{1}{J_b} \\ 1 & -1 & 0 & 0 \\ 0 & 0 & 0 & 0 \end{bmatrix}$$

$$B_{ext1} = \begin{bmatrix} B_e \\ 0 \end{bmatrix} = \begin{bmatrix} \dfrac{1}{\eta J_e} \\ 0 \\ 0 \\ 0 \end{bmatrix} \quad B_{ext2} = \begin{bmatrix} B_0 \\ 0 \end{bmatrix} = \begin{bmatrix} 0 \\ -\dfrac{1}{J_b} \\ 0 \\ 0 \end{bmatrix}$$

-continued $$K = \begin{bmatrix} K_1 \\ K_2 \\ K_3 \\ K_4 \end{bmatrix} \quad C_{ext} = (1\ 0\ 0\ 0)$$

The meanings of the respective values in the above observer equation (2) are as shown in the following Table 2.

TABLE 2

| $\chi_{ext}$ | $\omega_e'$ | Estimation value of $\omega_e$ (Estimated speed of drive shaft on engine side) [rad/s] |
|---|---|---|
| | $\omega_b'$ | Estimation value of $\omega_b$ (Estimated speed of drive shaft on wheel side) [rad/s] |
| | $\theta'$ | Estimation value of $\theta$ (Estimated torsion amount of drive shaft) [rad] |
| | $T_{err}'$ | Engine torque of travel resistance error [N · m] |
| | $T_e$ | Estimation value of engine torque [N · m] |
| | $T_b$ | Estimation value of travel resistance [N · m] |
| | $\omega_e$ | Measured value of rotational speed of drive shaft on engine side [rad/s] |
| | $K(K_1$-$K_4)$ | Observer gain |
| | $J_e$, $J_b$, $K_b$, $C_b$, $\eta$ | According to Table 1 |

The behavior estimating module 27 estimates the various state quantities $\omega_e'$, $\omega_b'$, $\theta'$, and $T_{err}'$ of the vehicle 1 based on the known values $T_e$, $T_b$ and $\omega_e$ by using the above observer equation (2). That is, by using as the known values the engine torque estimation value $T_e$ inputted from the torque estimating module 26, the travel resistance estimation value $T_b$ of the vehicle 1 inputted from the travel resistance estimating module 25, and the engine speed inputted from the actual value measuring module 24, the behavior estimating module 27 assigns the known values to the observer equation (2). Thus, the behavior estimating module 27 obtains the engine-side estimation speed $\omega_e'$ of the drive shaft 5, the wheel-side estimation speed $\omega_b'$ of the drive shaft 5, the estimated torsion amount $\theta'$ of the drive shaft 5, and the estimation value $T_{err}'$ of the travel resistance error of the vehicle 1.

Note that the engine speed inputted from the actual value measuring module 24 is converted into the rotational speed of the drive shaft 5 (that is, a value obtained by dividing by a reduction gear ratio $\eta$ of the transmission 3), and the converted value is applied in the observer equation (2) as $\omega_e$.

Here, the observer gain K in the observer equation (2) is calculated from, for example, an optimal gain calculation function which is used in a control design tool, such as MATLAB.

The reduction gear ratio $\eta$ in the observer equation (2) is specified by a ratio between the engine speed detected by the engine speed sensor 15 and the wheel speed (the rotational speed of the wheel 6) detected by the vehicle speed sensor 13. For example, from among a plurality of reduction gear ratios set corresponding to respective gear ranges of the transmission 3, the ratio which is the same as/close to the ratio between the engine speed and the wheel speed is specified and used as the reduction gear ratio $\eta$.

While the theory as the basis of the state quantity estimation by the behavior estimating module 27 is described above, in the actual calculation, the behavior estimating module 27 uses the following discrete equation (3) derived by discretizing the observer equation (2).

$$x_{ext}[i+1] = x_{ext}[i] + \Delta t \{ A_{ext} x_{ext}[i] + B_{ext1} T_e + B_{ext2} T_b - K (C_{ext} x_{ext}[i] - \omega_e) \} \quad (3)$$

"$\Delta t$" in this discrete equation (3) is a time interval (sampling time) at which the behavior estimating module 27 obtains the estimation values of the state quantities, for example, about 1 msec. That is, the behavior estimating module 27 uses the previously obtained estimation value $\omega_{ext}[i+1]$ as the next $\omega_{ext}[i]$, and repeats this processing at each $\Delta t$.

Note that since such processing is continuously executed immediately after the engine 2 is started, $(0\ 0\ 0\ 0)^T$ is selected as an initial value $\chi_{ext}[0]$ of $\chi_{ext}$.

4. Vibration Damping Control Method During Acceleration of Vehicle 1

Next, the method of the vibration damping control executed by the controller 12 during acceleration of the vehicle 1 is described with reference to FIGS. 5 to 7.

Figure 5:
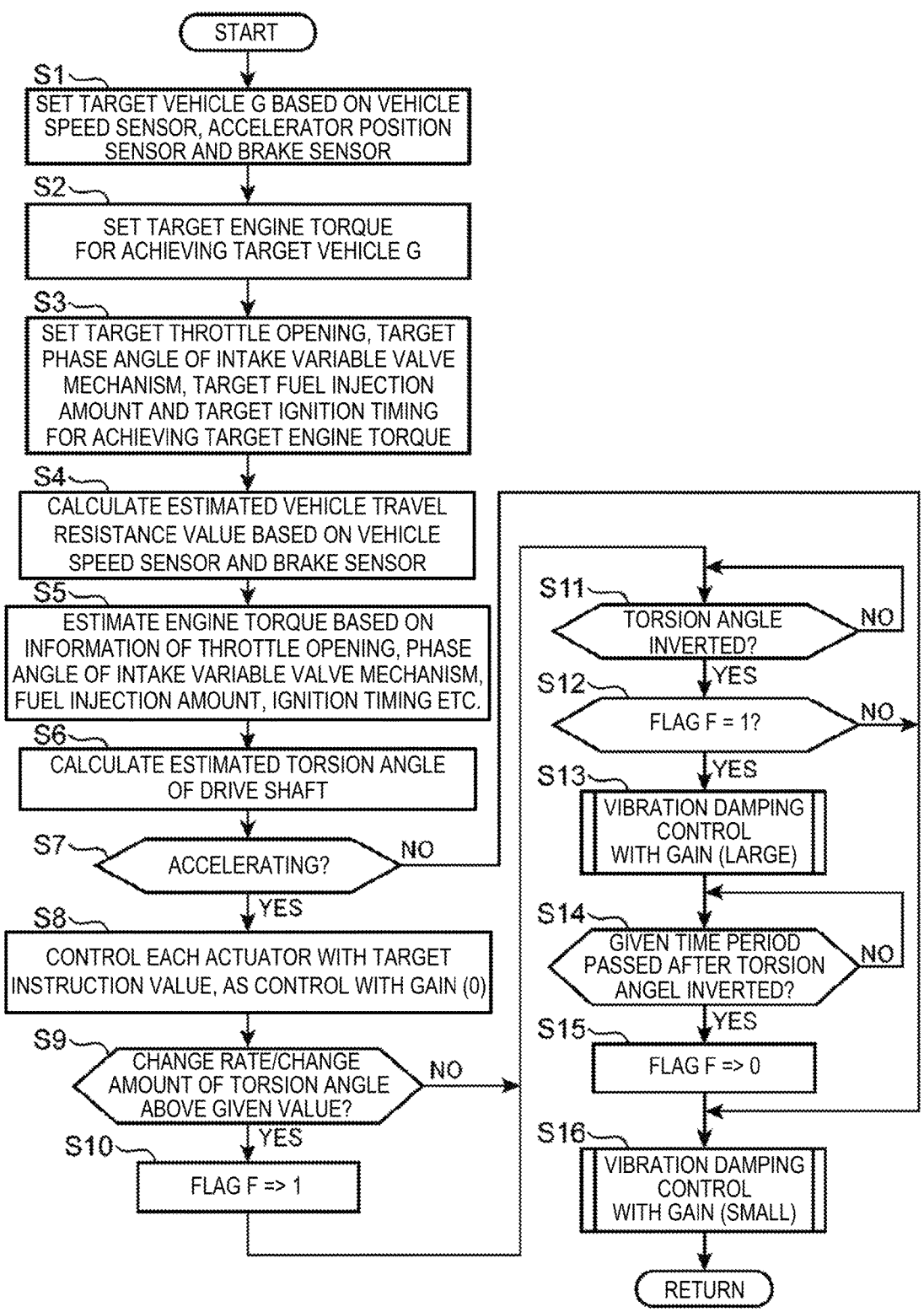
FIG. 5 is a flowchart illustrating a control executed by a controller while the vehicle accelerates.

As illustrated in FIG. 5, the controller 12 sets a target acceleration of the vehicle 1 based on the inputted information of the vehicle speed sensor 13, the accelerator position sensor 14, and the brake sensor 16 (S1). Further, the torque converting module 21 of the controller 12 sets a target engine torque (requested torque) $T_0$ for achieving the acceleration of the vehicle 1 set as described above (S2). As described above, at the stage of S2, the requested torque $T_0$ is set in proportion to the acceleration opening without taking into consideration the torsion of the drive shaft 5.

Next, the torque controlling module 23 of the controller 12 sets a target throttle opening, a target phase angle of the intake variable valve mechanism, a target fuel injection amount, and a target ignition timing, so as to achieve the set requested torque $T_0$ (S3).

Next, the travel resistance estimating module 25 of the controller 12 calculates the travel resistance $T_b$ estimated to be applied to the vehicle 1 (travel resistance estimation value) based on the vehicle speed and the brake pressure inputted from the actual value measuring module 24 (S4).

Next, the torque estimating module 26 of the controller 12 estimates the engine torque estimation value $T_e$ based on the inputted information, such as the throttle opening, the phase angle of the intake variable valve mechanism, the fuel injection amount, the ignition timing, etc. (S5). Note that instead of estimating the torque using the throttle opening, the air amount inside the cylinder 11 where the ignition is performed next (in the nearest future) may be estimated based on a measurement value of the intake air amount obtained by, for example, an airflow sensor and a physical model of an intake system, and based on this estimation value, the engine torque estimation value $T_e$ may be estimated.

Next, the behavior estimating module 27 of the controller 12 applies the information of the engine speed inputted from the engine speed sensor 15, the travel resistance estimation value $T_b$ of the vehicle 1 calculated at S4, and the engine torque estimation value $T_e$ estimated at S5, to the observer equation (2) (particularly, the discrete equation (3) obtained by discretizing the observer equation (2)). Thus, the various state quantities, including the engine-side estimation speed $\omega_e'$ of the drive shaft 5 and the wheel-side estimation speed $\omega_b'$ of the drive shaft 5, are calculated. Further, the controller 12 calculates an estimated torsion angle of the drive shaft 5 based on a difference between the engine-side estimation speed $\omega_e'$ and the wheel-side estimation speed $\omega_b'$ of the drive shaft 5 ($\omega_e' - \omega_b'$) (S6).

Next, the controller 12 determines whether the vehicle 1 is accelerating based on the inputted information from the accelerator position sensor 14, etc. (S7). If the vehicle 1 is determined to be accelerating (S7: YES), the controller 12 controls the target opening of the throttle valve 17, the target opening period of the fuel injector 20, the target charging timing of the ignition plug 19, etc. as the target control values for achieving the intake air amount, the fuel injection amount, and the ignition timing of the engine 2 which are required to generate the requested torque $T_0$ set by the torque converting module 21 (S8).

Thus, in this embodiment, while the driver depresses the accelerator pedal 7, respective actuators are controlled so as to generate the requested torque $T_0$ proportional to the accelerator opening, without performing the torque correction.

Next, while the driver depresses the accelerator pedal 7 to accelerate, the controller 12 determines whether a change rate/change amount of the torsion angle of the drive shaft 5 is above a given value (S9). If the change rate/change amount of the torsion angle of the drive shaft 5 is above the given value (S9: YES), a flag is set up, i.e., F=1 (S10). Note that this determination continues until the change rate of the torsion angle of the drive shaft 5 is inverted as described next.

Next, the controller 12 determines whether the torsion angle of the drive shaft 5 is inverted from "positive" to "negative" (S11). That is, during the acceleration, the engine-side estimation speed $\omega_e'$ of the drive shaft 5 is high relative to the wheel-side estimation speed $\omega_b'$ of the drive shaft 5, which establishes the relationship $(\omega_e'-\omega_b')>0$. After the driver substantially fixes the depression amount of the accelerator pedal 7, $(\omega_e'-\omega_b')<0$ is eventually established. At S11, the controller 12 waits for $(\omega_e'-\omega_b')<0$ to be established for the first time after the start of the acceleration.

When the controller 12 determines that the torsion angle of the drive shaft 5 is inverted from "positive" to "negative" (S11: YES), the controller 12 determines whether the flag is set up (S12). When F=1 (S12: YES), the controller 12 carries out the torque correction with a large gain and executes the vibration damping control (S13).

Figure 6:
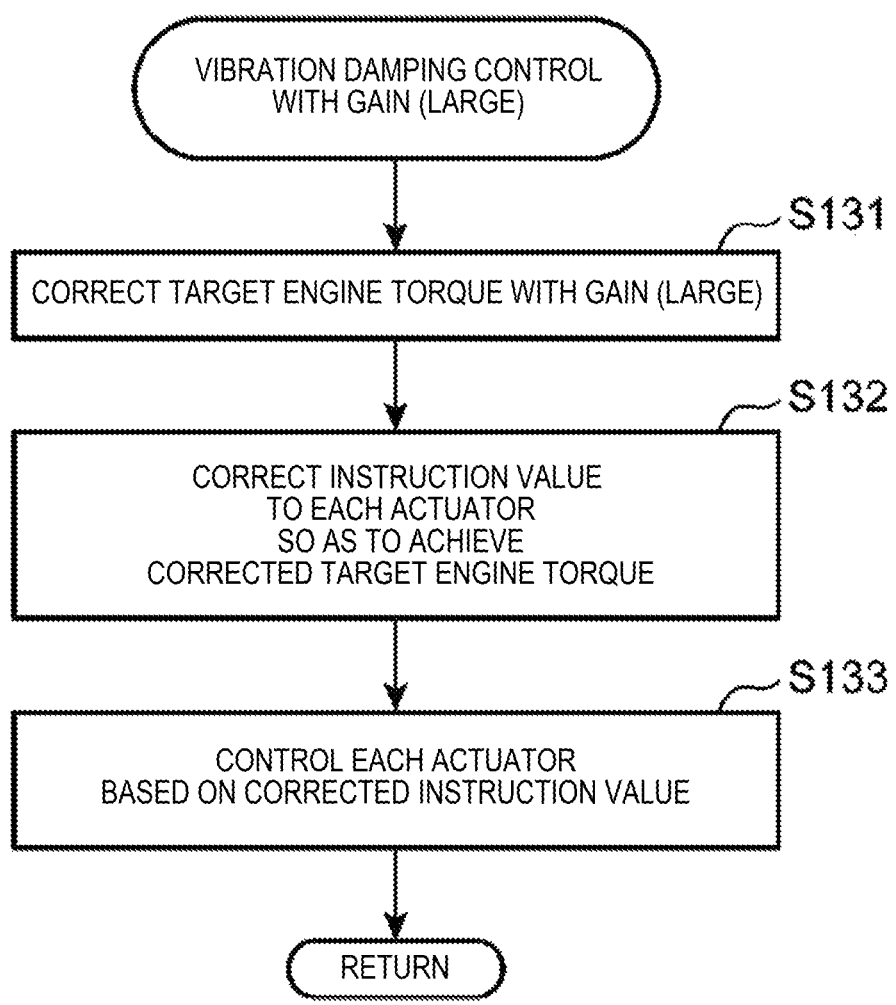
FIG. 6 is a flowchart illustrating a vibration damping control with a large gain.

As illustrated in FIG. 6, in the vibration damping control with the large gain, the feedback module 22 of the controller 12 sets the torque correction amount $T_Q$ with the large gain and sets the corrected target torque $T_{fb}$ which is the value obtained by adding to the requested torque $T_0$ the torque correction amount $T_Q$ inputted from the feedback module 22 (S131). Further, in order to generate the set corrected target torque $T_{fb}$, the torque controlling module 23 of the controller 12 resets the target values of the intake air amount, the fuel injection amount, and the ignition timing (S132), and controls the throttle valve 17, the fuel injector 20, and the ignition plug 19 based on these values (S133). In this embodiment, the torque correction is executed by retarding the ignition timing, as one example.

Returning to FIG. 5, the controller 12 continues the vibration damping control with the large gain for a given period of time starting from the timing at which the torsion angle of the drive shaft 5 is inverted (S14: NO).

At S14, if the controller 12 determines that the given time has passed (S14: YES), the controller 12 sets the flag to be F=0 (S15), and executes the vibration damping control with a small gain (S16).

Further at S12, if the flag is not set up, i.e., F=0 (S12: NO), the controller 12 performs the torque correction with the small gain and executes the vibration damping control (S16).

Figure 7:
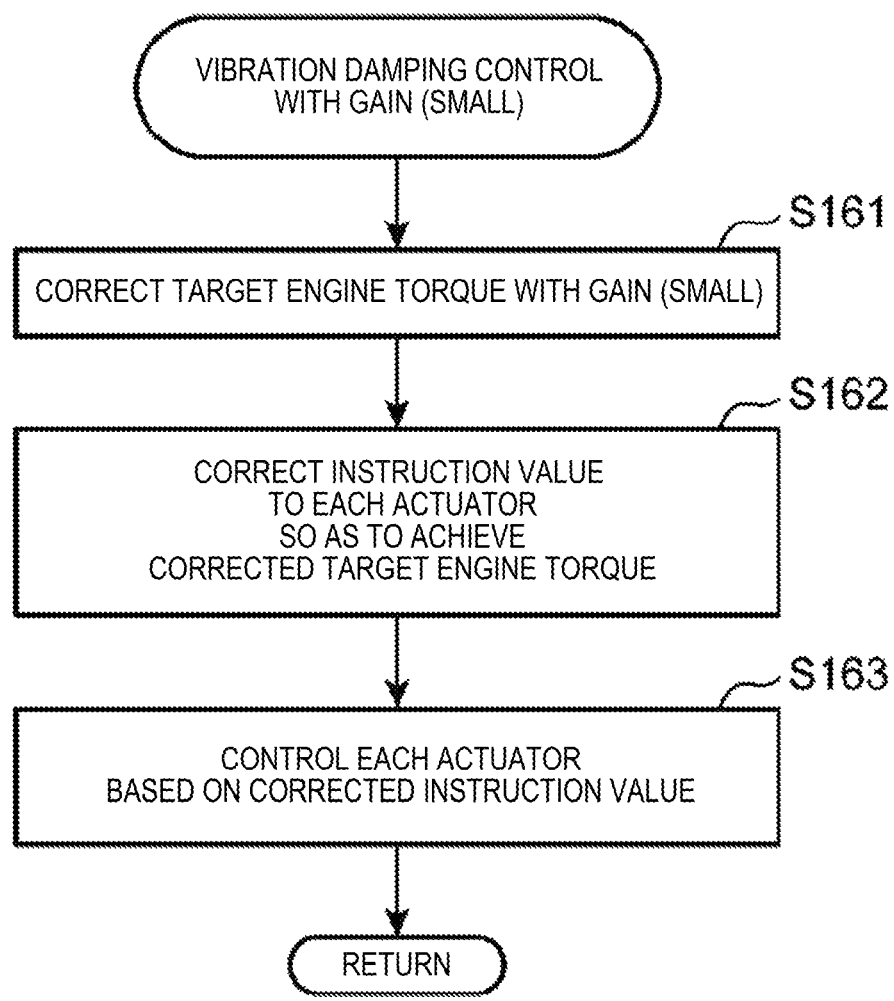
FIG. 7 is a flowchart illustrating a vibration damping control with a small gain.

As illustrated in FIG. 7, in the vibration damping control with the small gain, the feedback module 22 of the controller 12 sets the torque correction amount $T_Q$ with the small gain and sets the corrected target torque $T_{fb}$ which is the value obtained by adding to the requested torque $T_0$ the torque correction amount $T_Q$ inputted from the feedback module 22 (S161). Further, in order to generate the set corrected target torque $T_{fb}$, the torque controlling module 23 of the controller 12 resets the target values of the intake air amount, the fuel injection amount, and the ignition timing (S162), and controls the throttle valve 17, the fuel injector 20, and the ignition plug 19 (S163).

Then, unless the driver further depresses the accelerator pedal 7, the vibration damping control with the small gain continues.

Note that also when the controller 12 determines that the vehicle 1 is not accelerating (S7: NO), or when the controller 12 determines that the change rate/change amount of the torsion angle of the drive shaft 5 is below the given value (S9: NO), it executes the vibration damping control with the small gain (S16).

5. Calculation of Torque Correction Amount $T_Q$

In the above description, an absolute value of the torque correction amount $T_Q$ is calculated to be proportional to an absolute value $|\omega_e'-\omega_b'|$ of the estimated speed difference of the drive shaft 5. For example, the torque correction amount $T_Q$ is calculated through the following calculation.

The engine torque is a torque generated by combustion in each cylinder 11. Thus, even if the torque correction amount $T_Q$ is calculated, the torque to which the torque correction amount $T_Q$ is added is actually generated at the next ignition timing. Therefore, in this embodiment, the torque correction amount is determined by taking into consideration such a delay in the torque generation based on the estimated speed difference $(\omega_e'-\omega_b')$ of the drive shaft 5 at the current time point.

Here, the delay in the torque generation, that is, the time until the next combustion, may be specified based on the ignition interval in each cylinder 11. Note that the ignition interval is a time difference between the ignition timing of a certain cylinder 11 and the ignition timing of the next cylinder to be ignited, which is, for example, a period of time corresponding to a crank angle of 180° (180° CA) in a case of a four-cylinder engine.

When the estimated speed difference $(\omega_e'-\omega_b')$ of the drive shaft 5 at the current time point is f(t) and the estimated speed difference $(\omega_e'-\omega_b')$ after a given delay time d from the current time point is f(t+d), the estimated speed difference f(t+d) of the drive shaft 5 after the lapse of the delay time d may be obtained based on the estimated speed difference f(t) at the current time point by using the following equation (4).

$$\left. \begin{array}{l} f = \omega_e' - \omega_b' \\ f(t+d) = \cos(ad)f(t) + \dfrac{\sin(ad)}{a}f'(t) \end{array} \right\} \quad (4)$$

In the above equation (4), "a" is a value corresponding to a resonance frequency $(a/2\pi)$ of the drive shaft 5 set in advance for every gear range of the transmission 3, "f'(t)" is a time derivative of f(t). That is, since majority of vibration which actually occurs in the vehicle 1 is greatly influenced by the torsional resonance of the drive shaft 5, the estimated speed difference $(f=\omega_e'-\omega_b')$ of the drive shaft 5 may be assumed to change depending on the resonance frequency, in other words, f(t)=sin(at). Therefore, based on this assumption, f(t+d) at the time point advanced by the delay time d may be expressed as the above equation (4).

When the estimated speed difference f(t+d) of the drive shaft 5 after the lapse of delay time d is obtained as in the above equation (4), a value obtained by multiplying a given feedback gain k to f(t+d), that is, k×f(t+d) may be calculated as the torque correction amount $T_Q$ as in the following equation (5).

$$T_Q = k \times f(t+d) \qquad (5)$$

Here, in this embodiment, the vibration damping control is executed by correcting the engine torque to be reduced. Therefore, in this embodiment, $f(t+d)=\omega_e'-\omega_b'$ is "positive" unless otherwise noted. In other words, the engine-side estimation speed $\omega_e'$ of the drive shaft 5 is assumed to be higher than the wheel-side estimation speed $\omega_b'$ of the drive shaft 5. Thus, the torque correction amount $T_Q$ is a "negative" value.

Note that, at S8 illustrated in FIG. 5, the control is executed with the zero gain. Here, "zero gain" means "k=0" in the above equation (5), which means that the torque correction amount $T_Q=0$.

Further, "large gain" at S13 means the value of "k" in the above equation (5) relative to "small gain" at S16, in other words, the value of the feedback gain k.

6. Specific Example of Vibration Damping Control

Figure 8:
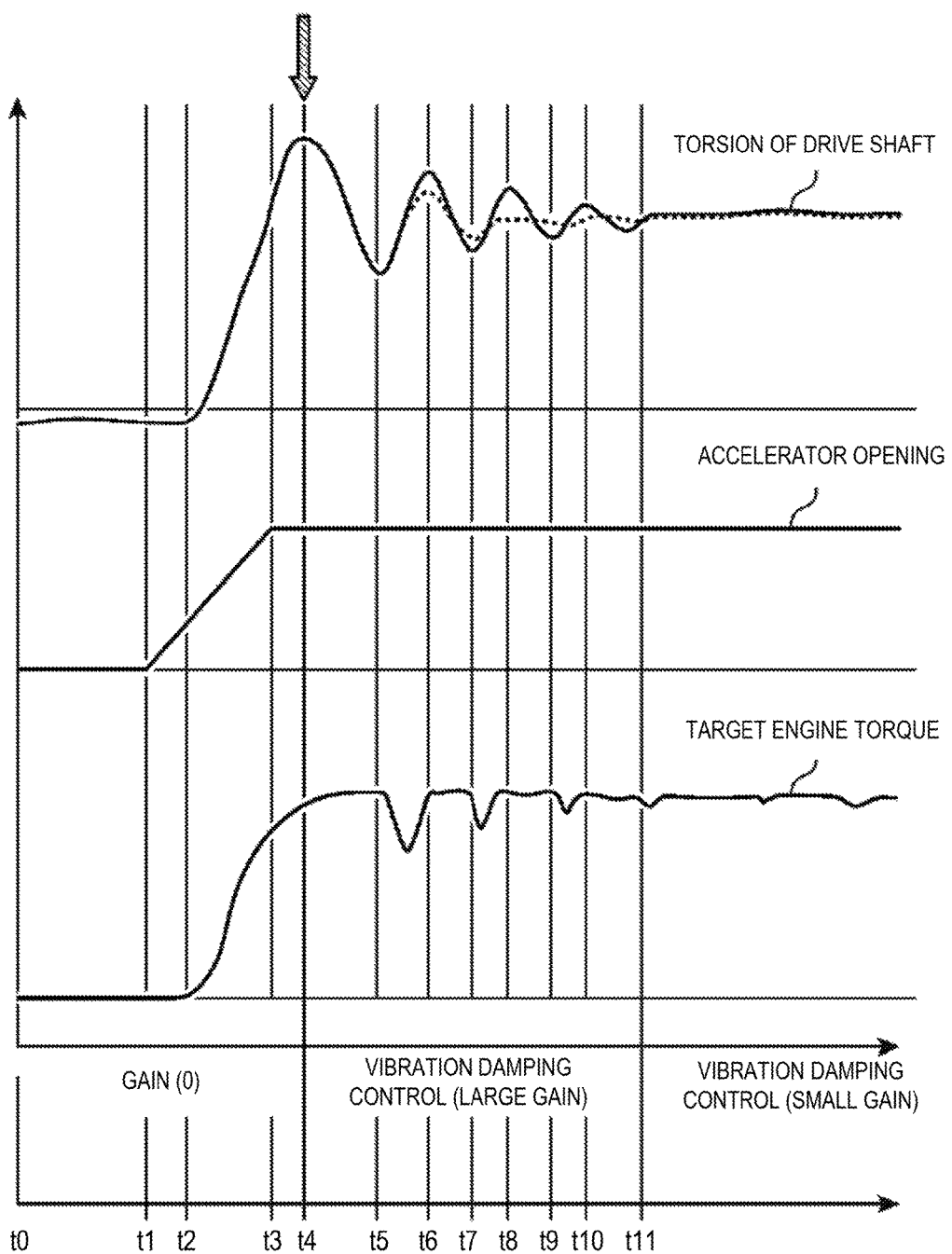
FIG. 8 is a schematic view illustrating a relationship between a target engine torque and torsion of a drive shaft of the vehicle.

The vibration damping control described with reference to FIGS. 5 to 7 is further described using a specific example with reference to FIG. 8. FIG. 8 is a schematic view illustrating the torsion of the drive shaft, the accelerator opening, and the target engine torque from the top on the vertical axis, and time on the horizontal axis.

As illustrated in FIG. 8, in this specific example, from a timing t0 to a timing t1, the driver is not depressing the accelerator pedal 7 and the vehicle is in an inertia (coast) running state. Therefore, the torsion of the drive shaft 5 is in a "negative" state, that is, the wheel-side estimation speed $\omega_b'$ is higher than the engine-side estimation speed $\omega_e'$.

When the driver depresses the accelerator pedal 7 at the timing t1, the target engine torque starts to rise from a slightly delayed timing t2. In response to this, the value of the torsion of the drive shaft also starts to rise. That is, the estimated speed difference $(\omega_e'-\omega_b')$ of the drive shaft 5 becomes "positive" after the timing t2 which is during acceleration of the vehicle 1.

The target engine torque and the torsion of the drive shaft 5 continuously rise (increase) while the driver increases the depression amount of the accelerator pedal 7 and also for a while after a time point at which the depression amount reaches a certain amount (timing t3). For example, the target engine torque and the torsion of the drive shaft 5 continue to rise (increase) until a timing t4.

In this specific example, while the torsion of the drive shaft 5 is increasing, that is, from the timing t2 to the timing t4, the torque correction amount $T_Q=0$ is set (the torque control with the zero gain). Thus, the engine torque increases according to the depression amount of the accelerator pedal 7 by the driver.

Further, the controller 12 monitors the change rate (angular speed)/change amount of the torsion angle of the drive shaft 5 in the period from the timing t2 to the timing t4. The controller 12 determines whether the change rate (angular speed)/change amount of the torsion angle of the drive shaft 5 is above a given value, and if it is determined to be above the given value, the controller 12 sets up the flag (S10 in FIG. 5). Depending on whether F=1 or F=0, the level of the vibration damping control from the timing t4 to a timing t11 changes.

Note that in the example of FIG. 8, a case where the controller 12 determines that the change rate (angular speed)/change amount of the torsion angle of the drive shaft 5 is above the given value in the period from the timing t2 to the timing t4 is considered.

In the above description, "the change rate of the torsion angle" is "inclination" in the characteristic chart of the torsion of the drive shaft 5 in FIG. 8, and "the change amount of the torsion angle" is "height" in the characteristic chart of the torsion of the drive shaft 5 in FIG. 8.

As indicated by the portion of FIG. 8 pointed by an arrow, at the timing t4 which is slightly after the timing t3 when the driver stops increasing the depression amount of the accelerator pedal 7, the change rate of the torsion angle of the drive shaft 5 (inclination) is inverted from "positive" to "negative." In this example, the vibration damping control with the large gain is executed from this timing t4.

As illustrated in FIG. 8, the torsion of the drive shaft 5 converges by repeating the inversions of the change rate from "positive" to "negative" and "negative" to "positive" for a plurality of times. In the example illustrated in FIG. 8, the convergence is achieved within substantially three cycles.

As illustrated in FIG. 8, regarding the target engine torque, firstly, the torque correction (correction for reducing the torque) is performed from a timing t5 to a timing t6. Here, the timing t5 is when the change rate of the torsion angle of the drive shaft reinverts from "negative" to "positive."

By the torque correction between the timing t5 and the timing t6, the amplitude of the torsion of the drive shaft is lowered at the cycle between the timing t5 and a timing t7 as indicated by the dotted line in FIG. 8.

Similarly, the controller 12 performs the torque correction in each of a period from the timing t7 to a timing t8 and a period from a timing t9 and a timing t10. The timing at which this torque correction is performed is also, similarly to above, a timing at which the change rate of the torsion angle of the drive shaft reinverts from "negative" to "positive."

Note that as illustrated in FIG. 8, the torque correction amount in the torque correction performed the second time is set smaller than the torque correction amount in the torque correction performed for the first time, and the torque correction amount in the torque correction performed the third time is set even smaller. This is because the torsion amplitude of the drive shaft 5 is lowered by the first-time torque correction (the torque correction from the timing t5 to the timing t6), and the torsion amplitude of the drive shaft 5 is further lowered by the second-time torque correction (the torque correction from the timing t7 to the timing t8).

Further, after the timing t11, the controller 12 executes the vibration damping control with the small gain. The timing t11 is a timing after a given period of time from the timing t4 at which the change rate of the torsion angle of the drive shaft 5 first inverts from "positive" to "negative." This given time period is set in advance by taking into consideration torsional stiffness of the drive shaft 5, characteristics (response and torque characteristics) of the engine 2, etc.

Note that the transition timing from the vibration damping control with the large gain to the vibration damping control with the small gain may be determined based on a cycle of the torsion of the drive shaft 5. Alternatively, the transition timing from the vibration damping control with the large gain to the vibration damping control with the small gain may be determined according to the gear ratio of the transmission 3.

7. Effects

The controller 12 of the vehicle 1 according to this embodiment executes the vibration damping control by the torque correction from the timing t4 at which the change rate of the torsion angle of the drive shaft 5 is determined to have inverted from "positive" to "negative" for the first time after the timing t1 at which the accelerator pedal 7 is started to be depressed. In other words, from the timing t1 to the timing t4, the controller 12 sets the target engine torque according to the depression amount of the accelerator pedal 7 by the driver, without performing the torque correction.

Therefore, at least after the accelerator pedal 7 is started to be depressed, until the change rate of the torsion angle of the drive shaft 5 inverts from "positive" to "negative" (from the timing t1 to the timing t4), the controller 12 of the vehicle 1 drives the engine 2 at the torque requested by the driver. Therefore, a satisfactory response to a driver's acceleration request is provided.

Further, the controller 12 performs the torque correction with the large gain a plurality of times in the given time period from the timing t4 at which the change rate of the torsion angle of the drive shaft 5 is determined to have inverted from "positive" to "negative" for the first time. Therefore, the controller 12 effectively reduces the vibration of the vehicle 1 caused by the torsion of the drive shaft 5. That is, the phenomenon in which the change rate of the torsion angle of the drive shaft 5 is inverted from "positive" to "negative" or vice versa greatly influences the vibration of the vehicle 1. Therefore, in this embodiment, after determining the first time that the change rate of the torsion angle of the drive shaft 5 is inverted from "positive" to "negative," the vibration of the vehicle 1 during acceleration is effectively reduced by executing the vibration damping control with the large gain.

Therefore, also during the acceleration, the controller 12 of the vehicle 1 according to this embodiment reduces the vibration of the vehicle 1 caused by the torsion of the drive shaft 5, and provides the satisfactory response to the driver's acceleration request.

Note that in this embodiment, from the timing t1 to the timing t4, the torque corresponding to the depression amount of the accelerator pedal 7 by the driver is outputted to the engine 2 without performing the torque correction; however, it is not limited to this. A small amount of torque correction may be performed within a range where the satisfactory response to the driver's acceleration request is provided.

Further, in this embodiment, the torque correction amount in the period from the timing t4 to the timing t11 is set based on at least one of the change amount and the change rate of the torsion angle of the drive shaft 5 from the timing t2 to the timing t4. Therefore, the vibration of the vehicle 1 is effectively reduced. That is, since the change amount and the change rate of the torsion angle of the drive shaft 5 from the timing t2 to the timing t4 greatly influence the vibration of the vehicle during the acceleration, the torque correction amount is defined for the period from the timing t4 to the timing t11.

As described with reference to FIG. 8, from the timing t4, the inversions from "positive" to "negative" and from "negative" to "positive" of the change rate in the torsion angle of the drive shaft 5 respectively occur a plurality of times. In this embodiment, the vibration damping control is executed by performing the torque correction for the given time period until the timing t11. Thus, the vibration of the vehicle 1 during the acceleration is effectively reduced.

As described above, considering that the gear ratio of the transmission 3 influences the number of times of inversions in torsion of the drive shaft 5, the time period for which the torque correction with the large gain is performed may be set according to the gear ratio of the transmission 3. As a result, the vibration of the vehicle 1 during the acceleration is effectively reduced at any gear ratio.

The controller 12 converges the inversions of the torsion of the drive shaft 5 and reduces the vibration of the vehicle 1 by the timing t11. After the timing t11, the controller 12 executes the vibration damping control by performing the torque correction with the small gain. By executing this control, after the timing t11, the control is shifted to the vibration damping control with the small gain so that a response to a request related to the driver's operation is provided, without executing excessive torque control.

Note that although in this embodiment the method of retarding the ignition timing of the ignition plug 19 is adopted as the torque correction method, the torque correction method is not limited to this. For example, the torque correction may be performed by controlling at least one of the throttle valve 17, the variable valve mechanism 18, and the fuel injector 20.

The controller 12 of the vehicle 1 according to this embodiment estimates the torsion of the drive shaft 5 by using the observer equation which describes the behavior of the control target model which is one model of the driving force transmission system of the vehicle 1, including the drive shaft 5. Therefore, even in a case where the torsion angle of the drive shaft 5 changes from moment to moment during the acceleration of the vehicle 1, the torsion angle of the drive shaft 5 is estimated with high accuracy. Thus, the inversion of the torsion of the drive shaft 5 is reliably converged and the vibration of the vehicle 1 is reliably reduced.

Second Embodiment

Configurations of a vehicle and a controller according to a second embodiment of the present disclosure are described by simply raising the differences from the first embodiment. The parts for which description is omitted are similar to those in the first embodiment.

First, in the vehicle of this embodiment, various operation buttons of a cruise control are provided on a steering wheel, an operation panel, etc. The various operation buttons of the cruise control include a set vehicle speed change button. A control unit of the cruise control is provided with a functional part (acceleration request amount detecting module) for detecting an acceleration request amount requested by a vehicle driver when he/she controls the set vehicle speed change button. The module may be software stored in memory and executed by a processor or processing circuitry of the control unit to achieve its function. The functional part sequentially outputs the detected amount to the controller 12.

The controller 12 executes various calculations based on inputted information from the sensors 13 to 16 and the inputted information on the acceleration request amount from the control unit of the cruise control, and sequentially determines a torque to be generated in the engine 2 according to the situation at the time. Further, the controller 12 determines an optimal condition for generating the determined torque, and outputs corresponding control signals to the throttle valve 17, the variable valve mechanisms 18, the ignition plugs 19, and the fuel injectors 20 (see FIG. 2).

In the first embodiment, the controller 12 determines whether the vehicle 1 is accelerating based on the inputted information from the accelerator position sensor 14, etc. (S7 in FIG. 5). On the other hand, the controller 12 of this embodiment determines whether the vehicle 1 is accelerating based on the inputted information on the acceleration request amount from the control unit of the cruise control, in addition to the inputted information from the accelerator position sensor 14.

In this embodiment, even when the driver increases the set vehicle speed while the cruise control is activated, similar to the first embodiment, the control, from S8 illustrated in FIG. 5, is executed to reduce the vibration of the vehicle caused by the torsion of the drive shaft 5.

For example, when the set vehicle speed change button of the cruise control is controlled by the driver to set a higher vehicle speed than the current vehicle speed, the control unit of the cruise control outputs the information of the newly set speed to the torque converting module 21 of the controller 12.

Further, the controller 12 sets a first torque value based on the difference between the current vehicle speed and the set vehicle speed. That is, the controller 12 increases the first torque value as the difference between the current vehicle speed and the set vehicle speed increases.

Further, the controller 12 sets a second torque value based on the difference between the current vehicle speed and the set vehicle speed. Note that with the same vehicle speed difference, the second torque value is set lower than the first torque value.

As described above, in this embodiment, even when the driver increases the set speed while the cruise control is activated, the acceleration feeling expected by the driver is provided.

Also in this embodiment, similar to the first embodiment, after the change rate of the torsion angle of the drive shaft 5 is inverted from "positive" to "negative," the engine 2 is controlled to generate the driving force by having the second torque value which is lower than the first torque value. Therefore, the vibration of the vehicle caused by the torsion of the driving force transmission shaft is reduced.

[Modifications]

In the first and second embodiments, the FF vehicle (front-engine, front-wheel-drive vehicle) equipped with the gasoline engine is adopted as one example of the vehicle 1; however, the present disclosure is not limited to this. For example, a diesel engine may be adopted as the engine.

Needless to say, FR vehicles (front-engine, rear-wheel-drive vehicle), RR vehicles (rear-engine, rear-wheel-drive vehicles), MR vehicles (mid-ship-engine, rear-wheel-drive vehicles), 4WD vehicles (four-wheel-drive vehicles), etc. are also adoptable. In the FR and 4WD vehicles, vibration caused by torsion of a propeller shaft is reduced by executing similar controls to the above embodiments, and as a result, the vibration of the vehicle during the acceleration is reduced.

In the present disclosure, the drive source is not limited to the engine 2. For example, an electric vehicle including an electric motor as a drive source and a hybrid electric vehicle including an electric motor and an engine are adoptable.

For example, in the case of adopting the hybrid electric vehicle, the torque correction may also be performed from the timing t4 to the timing t5, from the timing t6 to the timing t7, and from the timing t8 to the timing t9 of FIG. 8. That is, when the change rate of the torsion angle of the drive shaft 5 is "negative," the electric motor may perform torque assist so that the inversion of the torsion angle of the drive shaft 5 is more reliably converged. Thus, the vibration caused by the torsion of the drive shaft 5 of the vehicle 1 is more reliably reduced.

In the first and second embodiments described above, the torque correction from the timing t4 to the timing t11 is performed only by retarding the ignition timing. However, in the present disclosure, for example, a correction may be performed in which the engine torque is substantially increased by reducing the power generation amount of the alternator 10.

In the first and second embodiments described above, the torsion of the drive shaft 5 is estimated by using the observer model describing the behavior of the control target model which is one model of the driving force transmission system of the vehicle 1, including the drive shaft 5. However, the present disclosure is not limited to this. For example, similar controls to the above embodiments may also be executed by sequentially measuring the rotational speed of the engine-side end portion and the rotational speed of the wheel-side end portion of the drive shaft 5.

In the description using FIG. 8, the vibration damping control with the large gain is executed from the timing t4 to the timing t11. As illustrated in the flowchart of FIG. 5, the torque correction amount in this period is determined based on whether the change rate/change amount of the torsion angle of the drive shaft 5 from the timing t2 to the timing t4 is above the given value. Therefore, when the change rate/change amount of the torsion angle of the drive shaft 5 from the timing t2 to the timing t4 is below the given value, the vibration damping control with the small gain is executed from the timing t4.

In the first and second embodiments described above, the three levels of gain are set for the control of the engine torque: "0," "small," and "large." However, the present disclosure is not limited to this. The engine torque may be controlled with at least two different levels of gains so that a finer torque correction is performed.

Further, in the first embodiment, the torque control of the engine 2 is executed according to the depression amount of the accelerator pedal 7 by the driver, without performing the torque correction from the timing t2 to the timing t4. However, the present disclosure is not limited to this. For example, when a road surface $\mu$ is determined to be low, even if the driver depresses the accelerator pedal 7, the torque correction may still be applied. Thus, the traveling stability of the vehicle 1 is reliably secured. This also applies to the second embodiment described above in which the set vehicle speed change button of the cruise control is provided as a member accepting an acceleration request from the driver.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
2 Engine (Drive Source)
5 Drive Shaft (Driving Force Transmission Shaft)
6 Wheel
12 Controller (Control Device)
21 Torque Converting Module
22 Feedback Module
23 Torque Controlling Module
26 Torque Estimating Module

What is claimed is:
1. A control device of a vehicle,
the vehicle including:
a drive source for generating torque as a driving force;
wheels;
a driving force transmission shaft provided in a driving force transmission path extending from the drive source to the wheels; and
an accelerator position sensor for detecting a depression amount of an accelerator pedal,
the control device performing:
one of estimation and detection of a torsion angle of a first end portion of the driving force transmission shaft at a drive source side with respect to a second end portion at the wheel side;
an instruction to the drive source to generate a first torque corresponding to the depression amount of the accelerator pedal when the depression of the accelerator pedal is determined to have started based on a detection result of the accelerator position sensor; and
an instruction to the drive source to generate a second torque when a change rate of the torsion angle is determined to have inverted from a positive rate to a negative rate for the first time after the depression of the accelerator pedal is determined to have started, the change rate of the torsion angle determined based on the acquisition result of the torsion angle, the second torque being lower than the first torque.

2. The control device of claim 1, wherein the second torque is set based on at least one of a change amount and the change rate of the torsion angle from a first time point when the depression of the accelerator pedal is determined to have started until a second time point when the change rate of the torsion angle is determined to have inverted from a positive rate to a negative rate for the first time.

3. The control device of claim 2, wherein the drive source is instructed to generate the second torque for a given period of time from the second time point.

4. The control device of claim 3, wherein
the vehicle also includes a transmission provided in the driving force transmission path, and
the given time period is set according to a gear ratio of the transmission.

5. The control device of claim 4, wherein after the given time period, the drive source is instructed to generate a third torque that is lower than the first torque and higher than the second torque.

6. The control device of claim 5, wherein
the drive source is an internal combustion engine,
the vehicle also includes a throttle valve, a variable valve mechanism, an ignition plug, and a fuel injector that are attached to the drive source, and
the drive source generates the first torque and the second torque by controlling at least one of the throttle valve, the variable valve mechanism, the ignition plug, and the fuel injector.

7. The control device of claim 6, wherein the torsion angle of the driving force transmission shaft is estimated by using an observer model describing behavior of a control target model that is a model of a driving force transmission system of the vehicle including the driving force transmission shaft.

8. The control device of claim 7, wherein
a torque correction amount that is a correction amount of the first torque according to the depression amount of the accelerator pedal is calculated based on the estimated torsion angle of the driving force transmission shaft, and
the second torque is a value obtained by correcting the first torque according to the torque correction amount.

9. The control device of claim 8, wherein the torque correction amount is set to gradually decrease according to a given cycle regarding the torsion angle of the driving force transmission shaft.

10. The control device of claim 9, wherein a feedback control is executed to control the torque.

11. The control device of claim 1, wherein the drive source is instructed to generate the second torque for a given period of time from the second time point.

12. The control device of claim 1, wherein the drive source is instructed to generate the second torque from the second time point until the change rate of the torsion angle is determined to have inverted from a positive rate to a negative rate a given number of times.

13. The control device of claim 12, wherein, after the change rate of the torsion angle is determined to have inverted from a positive rate to a negative rate the given number of times, the drive source is instructed to generate a third torque that is lower than the first torque and higher than the second torque.

14. The control device of claim 13, wherein
the drive source is an internal combustion engine,
the vehicle also includes a throttle valve, a variable valve mechanism, an ignition plug, and a fuel injector that are attached to the drive source, and
the drive source generates the first torque and the second torque by controlling at least one of the throttle valve, the variable valve mechanism, the ignition plug, and the fuel injector.

15. The control device of claim 14, wherein the torsion angle of the driving force transmission shaft is estimated by using an observer model describing behavior of a control target model that is a model of a driving force transmission system of the vehicle including the driving force transmission shaft.

16. The control device of claim 15, wherein
a torque correction amount that is a correction amount of the first torque according to the depression amount of the accelerator pedal is calculated based on the estimated torsion angle of the driving force transmission shaft, and
the second torque is a value obtained by correcting the first torque according to the torque correction amount.

17. The control device of claim 1, wherein
the drive source is an internal combustion engine,
the vehicle also includes a throttle valve, a variable valve mechanism, an ignition plug, and a fuel injector that are attached to the drive source, and
the drive source generates the first torque and the second torque by controlling at least one of the throttle valve, the variable valve mechanism, the ignition plug, and the fuel injector.

18. The control device of claim 1, wherein the torsion angle of the driving force transmission shaft is estimated by using an observer model describing behavior of a control target model that is a model of a driving force transmission system of the vehicle including the driving force transmission shaft.

19. The control device of claim 1, wherein a feedback control is executed to control the torque.

20. A control device of a vehicle,
the vehicle including:
- a drive source for generating torque as a driving force;
- wheels;
- a driving force transmission shaft provided in a driving force transmission path extending from the drive source to the wheels; and
- an acceleration request accepting member for accepting an acceleration request having an acceleration request amount from a driver of the vehicle, the control device performing:
- one of estimation and detection of a torsion angle of a first end portion of the driving force transmission shaft at a drive source side with respect to a second end portion at a wheel side;
- an instruction to the drive source to generate a first torque corresponding to the acceleration request amount when the acceleration request accepting member accepts the acceleration request to the vehicle; and
- an instruction to the drive source to generate a second torque when a change rate of the torsion angle is determined to have inverted from a positive rate to a negative rate for the first time after the acceleration request is accepted, the change rate of the torsion angle determined based on the acquisition result of the torsion angle, the second torque being lower than the first torque.

* * * * *